United States Patent
Tachikawa et al.

(10) Patent No.: US 12,199,286 B2
(45) Date of Patent: *Jan. 14, 2025

(54) ADDITIVE FOR ELECTROCHEMICAL ELEMENT POSITIVE ELECTRODE, COMPOSITION FOR ELECTROCHEMICAL ELEMENT POSITIVE ELECTRODE INCLUDING SAID ADDITIVE, AND ELECTROCHEMICAL ELEMENT

(71) Applicant: KURARAY CO., LTD., Kurashiki (JP)

(72) Inventors: Kengo Tachikawa, Kurashiki (JP);
Mao Takayama, Kurashiki (JP);
Yoshihisa Inui, Kurashiki (JP);
Hiroyuki Nishinami, Bizen (JP);
Yumika Nishita, Bizen (JP); Shushi Nishimura, Bizen (JP)

(73) Assignee: KURARAY CO., LTD., Kurashiki (JP)

( * ) Notice: Subject to any disclaimer, the term of this patent is extended or adjusted under 35 U.S.C. 154(b) by 33 days.

This patent is subject to a terminal disclaimer.

(21) Appl. No.: 17/912,096

(22) PCT Filed: Mar. 12, 2021

(86) PCT No.: PCT/JP2021/010085
§ 371 (c)(1),
(2) Date: Sep. 16, 2022

(87) PCT Pub. No.: WO2021/187367
PCT Pub. Date: Sep. 23, 2021

(65) Prior Publication Data
US 2023/0178748 A1    Jun. 8, 2023

(30) Foreign Application Priority Data

Mar. 17, 2020 (JP) ................................ 2020-046095
Mar. 17, 2020 (JP) ................................ 2020-046096

(51) Int. Cl.
| | | |
|---|---|---|
| H01M 4/62 | (2006.01) | |
| C01B 32/318 | (2017.01) | |
| C01B 32/336 | (2017.01) | |
| C01B 32/378 | (2017.01) | |
| H01G 11/34 | (2013.01) | |
| H01M 10/0525 | (2010.01) | |
| H01M 4/02 | (2006.01) | |

(52) U.S. Cl.
CPC ........... *H01M 4/625* (2013.01); *C01B 32/318* (2017.08); *C01B 32/336* (2017.08); *C01B 32/378* (2017.08); *H01G 11/34* (2013.01); *H01M 10/0525* (2013.01); *C01P 2006/12* (2013.01); *C01P 2006/14* (2013.01); *C01P 2006/16* (2013.01); *C01P 2006/40* (2013.01); *C01P 2006/80* (2013.01); *H01M 2004/021* (2013.01); *H01M 2004/028* (2013.01)

(58) Field of Classification Search
CPC ..... H01M 2004/021; H01M 2004/028; H01M 4/625; C01P 2006/12; C01P 2006/14
See application file for complete search history.

(56) References Cited

U.S. PATENT DOCUMENTS

| | | |
|---|---|---|
| 2008/0207442 A1 | 8/2008 | Pfeifer et al. |
| 2009/0201630 A1* | 8/2009 | Yoshino ................ C01B 32/342 423/299 |
| 2012/0064398 A1 | 3/2012 | Kim et al. |
| 2012/0202033 A1 | 8/2012 | Chang et al. |
| 2015/0357643 A1 | 12/2015 | Atanassova et al. |
| 2021/0269315 A1 | 9/2021 | Nishita et al. |
| 2023/0163305 A1* | 5/2023 | Tachikawa ............. H01G 11/32 429/232 |

FOREIGN PATENT DOCUMENTS

| | | | | |
|---|---|---|---|---|
| CN | 102856081 A | * | 1/2013 | .......... C01B 32/336 |
| EP | 2833382 A1 | | 2/2015 | |
| EP | 3076416 A1 | | 10/2016 | |
| JP | S 62154461 A | * | 7/1987 | ............... D01F 9/12 |
| JP | 2001126766 A | | 5/2001 | |
| JP | 2004296431 A | | 10/2004 | |
| JP | 2007317583 A | | 12/2007 | |
| JP | 2010509174 A | | 3/2010 | |
| JP | 2012059690 A | | 3/2012 | |
| JP | 5027849 B2 | | 9/2012 | |
| JP | 2014026819 A | | 2/2014 | |
| JP | 2014511322 A | | 5/2014 | |
| JP | 2019200894 A | | 11/2019 | |
| JP | 2020013881 A | | 1/2020 | |
| WO | WO-20080582312 A | | 5/2008 | |
| WO | WO-2012092210 A1 | | 7/2012 | |
| WO | WO-2020017553 A1 | | 1/2020 | |

OTHER PUBLICATIONS

English translation of the International Preliminary Report on Patentability and Written Opinion issued Sep. 20, 2022 in PCT/JP2021/010085, 4 pages.
International Search Report issued May 11, 2021 in PCT/JP2021/010085 (with English translation), 5 pages.
Extended European Search Report issued Jul. 19, 2024, in corresponding European Patent Application No. 21770784.3, 9 pages.

* cited by examiner

*Primary Examiner* — Khanh T Nguyen

(74) *Attorney, Agent, or Firm* — Element IP, PLC

(57) ABSTRACT

The present invention relates to an additive for an electrochemical element positive electrode comprising an activated carbon, wherein the activated carbon has a specific surface area in accordance with BET method of 1300-2500 m$^2$/g, a pore volume of pores having a diameter of 2 nm or more of 0.35 cm$^3$/g or less, a pore volume of pores having a diameter less than 2 nm of 0.5 cm$^3$/g or more, and an ash content of 0.5% by weight or less.

20 Claims, No Drawings

ADDITIVE FOR ELECTROCHEMICAL ELEMENT POSITIVE ELECTRODE, COMPOSITION FOR ELECTROCHEMICAL ELEMENT POSITIVE ELECTRODE INCLUDING SAID ADDITIVE, AND ELECTROCHEMICAL ELEMENT

TECHNICAL FIELD

The present application claims the priorities of Japanese Patent Application No. 2020-046095 (filing date: Mar. 17, 2020) and Japanese Patent Application No. 2020-046096 (filing date: Mar. 17, 2020) under the Paris Convention, the entire contents of which are incorporated herein by reference.

The present invention relates to an additive for an electrochemical element positive electrode comprising an activated carbon, a slurry stabilizer for an electrochemical element positive electrode comprising thereof and a composition for an electrochemical element positive electrode comprising the additive for an electrochemical element positive electrode. The present invention also relates to an electrochemical element comprising a positive electrode comprising a layer comprising the composition for an electrochemical element positive electrode.

BACKGROUND ART

The demand for an electrochemical element such as lithium ion secondary batteries, which are small in size, lightweight, have high energy density and can be repeatedly charged and discharged, is rapidly expanding by taking advantage of their characteristics. Lithium ion secondary batteries are used in fields such as mobile phones, laptops and electric vehicles because of their relatively high energy density. With the expansion and development of its applications, these electrochemical elements are required to be further improved such as lower resistance, higher capacity as well as improvement of mechanical properties and productivity.

The electrochemical elements such as lithium ion secondary batteries are being developed for the purpose of increasing the capacity, and in particular, the positive electrode material has a great influence on the capacity (miniaturization) of the battery, so there is an urgent need to increase its capacity and high performance. For example, in Patent Document 1, a positive electrode for a lithium secondary battery having excellent short-time output characteristics at low temperature is studied. Further, in Patent Document 2, in a lithium secondary battery using a manganese-based positive electrode active material, a lithium secondary battery in which manganese ions are adsorbed and trapped in an activated carbon is studied.

In Patent Documents 3 and 4, a lithium ion secondary battery capable of reducing decrease of battery capacity by removing water in the battery with a water adsorbent is studied.

In Patent Document 5, a non-aqueous lithium-type power storage element which exhibits excellent low temperature characteristics while added high temperature durability is studied. Further, in Patent Document 6, an activated carbon having particle size suitable for an electric double layer capacitor and having further reduced amount of surface functional groups is studied.

An electrochemical element electrode is formed by laminating an active material layer on a current collector, wherein the active material layer is usually formed by binding an electrode active material and an optional conductive material with a binder. For example, as a positive electrode active material of a lithium ion secondary battery, an oxide comprising lithium and a transition metal, which has a structure capable of intercalating lithium, such as $LiCoO_2$, $LiMn_2O_4$, and $LiNi_{1-x}Co_xO_2$ ($0<X<1$) is mainly known. Further, as a negative electrode active material, various forms of a carbon-based material including artificial or natural graphite and hard carbon capable of intercalation/deintercalation of lithium has been applied. However, in order to exhibit higher battery capacity, researches on a non-carbon-based negative electrode active material such as Si have been conducted recently.

As mentioned above, although $LiCoO_2$ has a high capacity, it is necessary to reduce the amount of Co being a rare metal, and as a result, $LiNi_{(10-x-y)}Co_xMn_yO_2$ ($0<x<10$, $0<Y<10$) and the like has been developed as a positive electrode active material. However, when such positive electrode active material having a high nickel content is used, there is a problem that the slurry tends to gelate especially on using a fluorine-based binder.

In order to solve this problem, a method to suppress the gelation by acidifying a binder component by copolymerization a fluorine-based binder resin with an acid component and preventing fluorine extraction by Ni is verified (Patent Document 7).

PRIOR ART DOCUMENTS

Patent Documents

[Patent Document 1] JP 2004-296431 A
[Patent Document 2] JP 2012-059690 A
[Patent Document 3] JP 2001-126766 A
[Patent Document 4] JP 2014-026819 A
[Patent Document 5] JP 2020-013881 A
[Patent Document 6] JP 5027849 B
[Patent Document 7] JP 2019-200894 A

SUMMARY OF THE INVENTION

Problems to be Solved by the Invention

The technique described in Patent Document 1 indicates that the carbonaceous material needs to have a pore volume of 20 Å or more of 0.418 cc/g or more. However, formation of excessive mesopores is economically difficult since the yield of the activated carbon becomes low. Further, there is a problem that the carbonaceous material strongly adsorbs anions, and thereby reducing the diffusivity of the ions. In the technique described in Patent Document 2, no consideration is given to the case where the activated carbon contains other metals, for example, an alkaline earth metal such as calcium which causes the gelation of a fluorine-based binder such as PVDF and significant decrease in coatability thereby.

In the techniques described in Patent Documents 3 and 4, the water adsorbent provided inside the lithium ion secondary battery becomes an unnecessary member after adsorbing water. That is, since the water adsorbent itself does not contribute to the improvement of the battery characteristics after adsorbing water, unnecessary member continues to exist inside the battery, which is not preferable from the viewpoint of improving the battery characteristics.

The activated carbon described in Patent Document 5 is used as a positive electrode active material of a power storage element with a content of 15% by mass or more in a positive electrode active material layer. Further, the activated carbon described in Patent Document 6 is applied to an electric double layer capacitor, is used for both a positive electrode and a negative electrode and is used as an active material in an electric double layer capacitor electrode in an amount of 80% by mass.

In the technique described in Patent Document 7, in the modification of the fluorine-based binder resin, the number of monomers that can be copolymerized is small, the amount of copolymerization modification is limited, and the alkali resistance is limited. In addition, there is a problem that the alkali resistance is affected by the additive of the positive electrode material. Therefore, there is a demand for a slurry stabilizer that is more stable, can prevent the gelation of the slurry, and can improve the coatability.

In view of the above problems, an object of the present invention is to provide
- an additive for an electrochemical element positive electrode which can improve the conductivity of the positive electrode, can reduce the electrode resistance and can improve the lithium utilization efficiency,
- a slurry stabilizer for an electrochemical element positive electrode which can prevent the gelation of the slurry, can improve the coatability and can improve the battery characteristics, and
- a composition for an electrochemical element positive electrode comprising the additive for an electrochemical element positive electrode.

Another object of the present invention is to provide an electrochemical element comprising a positive electrode produced by using the above composition, which has excellent battery characteristics.

Means for Solving the Problems

As a result of diligent studies by the present inventors, they have found that the above-mentioned problems can be solved by an additive for an electrochemical element positive electrode comprising a specific activated carbon, and have reached the present invention.

That is, the present invention encompasses the following aspects.

[1] An additive for an electrochemical element positive electrode comprising an activated carbon, wherein the activated carbon has a specific surface area in accordance with BET method of 1300-2500 $m^2/g$, a pore volume of pores having a diameter of 2 nm or more of 0.35 $cm^3/g$ or less, a pore volume of pores having a diameter less than 2 nm of 0.5 $cm^3/g$ or more, and an ash content of 0.5% by weight or less.

[2] The additive for an electrochemical element positive electrode according to [1], wherein the activated carbon has an oxygen content of 1.3% by weight or more and 3% by weight or less, and a hydrogen content of 0.33% by weight or more and 0.55% by weight or less.

[3] The additive for an electrochemical element positive electrode according to [1] or [2], wherein the activated carbon has an average particle size of 2 μm to 20 μm.

[4] A slurry stabilizer for an electrochemical element positive electrode comprising the additive for an electrochemical element positive electrode according to any one of [1] to [3].

[5] A composition for an electrochemical element positive electrode comprising the additive for an electrochemical element positive electrode according to any one of [1] to [3] and a positive electrode active material, wherein a content of the additive for an electrochemical element positive electrode is 10% by weight or less with respect to the total weight of the positive electrode active material.

[6] The composition for an electrochemical element positive electrode according to [5], further comprising a binder in an amount of 0.5 to 10% by weight with respect to the total solid content of the composition for an electrochemical element positive electrode.

[7] The composition for an electrochemical element positive electrode according to [5] or [6], further comprising a conductive material in an amount of 1 to 10% by weight with respect to the total solid content of the composition for an electrochemical element positive electrode.

[8] An electrochemical element comprising an electrochemical element positive electrode, wherein the positive electrode comprises a layer comprising the composition for an electrochemical element positive electrode according to any one of [5] to [7].

[9] The electrochemical element according to [8], wherein the electrochemical element operates from 2V to 5V.

[10] The electrochemical element according to [8] or [9], wherein the electrochemical element is a non-aqueous electrolyte secondary battery.

Effects of the Invention

According to the present invention, it is possible to provide
- an additive for an electrochemical element positive electrode which can improve the conductivity of the positive electrode, can reduce the electrode resistance and can improve the lithium utilization efficiency,
- a slurry stabilizer for an electrochemical element positive electrode which can prevent the gelation of the slurry, can improve the coatability and can improve the battery characteristics, and
- a composition for an electrochemical element positive electrode comprising the additive for an electrochemical element positive electrode. Further, it is possible to provide an electrochemical element comprising a positive electrode produced by using the above composition, which has excellent battery characteristics.

MODE FOR CARRYING OUT THE INVENTION

Hereinafter, one embodiment of the present invention is described in detail. However, this is presented as an example, which does not limit the invention and the invention is defined by the claims.

[Additive for Electrochemical Element Positive Electrode]

The additive for an electrochemical element positive electrode of the present invention comprises an activated carbon having a specific surface area in accordance with BET method of 1300 to 2500 $m^2/g$, a pore volume of pores having a diameter of 2 nm or more of 0.35 $cm^3/g$ or less, a pore volume of pores having a diameter less than 2 nm of 0.5 $cm^3/g$ or more, and an ash content of 0.5% by weight or less. The additive for an electrochemical element positive electrode of the present invention is an activated carbon having such specific pores and a small amount of ash, so that the activated carbon does not only adsorb the metal eluted from the positive electrode to reduce the risks such as precipitations or short circuits on the negative electrode being the counter electrode, but can also suppress basicization which is the cause of poor coating during electrode production, and can contribute to the manufacturing stability of the electrodes. Further, it is possible to improve the battery characteristics (particularly, the reduction of the electrode resistance and the reduction of the irreversible capacity) of the electrochemical element produced by using thereof. Moreover, the slurry stabilizer for an electrochemical element positive electrode comprising such additive for an electrochemical element positive electrode can prevent the gelation of the slurry for an electrochemical element positive electrode, and can improve the battery characteristics of the electrochemical element produced by using thereof.

(Activated Carbon)

The activated carbon used in the present invention has a specific surface area in accordance with BET method of 1300 to 2500 m$^2$/g. If the specific surface area is too small, the electrolyte in the electrolytic solution cannot be sufficiently retained to contribute to the resistance reduction, which is not preferable. If the specific surface area is too large, the mechanical strength is lowered, pulverization in the battery or releasing from the electrode during charging and discharging are occurred and resulting a short circuit which causes deterioration of a battery performance, which is not preferable. The specific surface area is preferably 1400 m$^2$/g or more, more preferably 1500 m$^2$/g or more. Further, the specific surface area is preferably 2400 m$^2$/g or less, more preferably 2300 m$^2$/g or less, still more preferably less than 2300 m$^2$/g, and particularly preferably 2200 m$^2$/g or less. That is, the specific surface area is preferably 1400 to 2400 m$^2$/g, more preferably 1500 to 2300 m$^2$/g, and still more preferably 1500 to 2200 m$^2$/g. The specific surface area can be adjusted to the above range by appropriately adjusting, for example, the type of the precursor of the activated carbon, the activation temperature in the method for producing the activated carbon described later, the activation time and the like.

The activated carbon used in the present invention has a pore volume of pores having a diameter of 2 nm or more (mesopore pore volume) of 0.35 cm$^3$/g or less, which is measured in accordance with the pore distribution analysis by DFT method by the nitrogen adsorption method. When the pore volume of pores having the diameter of 2 nm or more is included in this range, an electrolyte retention ability is excellent, a sufficient electrolyte environment can be maintained around the positive electrode active material in the positive electrode, and a fast ion transfer environment can be provided. The efficiency characteristic can be improved thereby. In addition, by such electrolyte retention ability, the cycle life can be improved since the ion transfer environment around the active material is maintained so that the electrolyte is not depleted in the positive electrode while the charge/discharge cycle proceeds. Meanwhile, when the pore volume of pores having the diameter of 2 nm or more is larger than the above range, the production yield of the activated carbon is significantly lowered, which is not only economically unfavorable, but it is also unfavorable since the bulk density of the activated carbon is increased, resulting in decrease in volume capacity as a positive electrode. In addition, the activated carbon strongly adsorbs on anions in the battery resulting the diffusivity of the ions, which leads to a decrease in battery output, which is not preferable. The pore volume of pores having the diameter of 2 nm or more is 0.35 cm$^3$/g or less, more preferably 0.33 cm$^3$/g or less, still more preferably 0.30 cm$^3$/g or less, and particularly preferably 0.25 cm$^3$/g or less. The lower limit is not particularly limited, but preferably 0.02 cm$^3$/g or more, and more preferably 0.06 cm$^3$/g or more. The pore volume of pores having the diameter of 2 nm or more can be adjusted to the above range by appropriately adjusting, for example, the type of the precursor of the activated carbon, the activation temperature in the method for producing the activated carbon described later, the activation time and the like.

The activated carbon used in the present invention has a pore volume of pores having a dimeter of less than 2 nm (micropore pore volume) of 0.5 cm$^3$/g or more, which is measured in accordance with the pore distribution analysis by the DFT method by the nitrogen adsorption method. When the pore volume of pores having the diameter of less than 2 nm is within the above range, Ni ions eluted from the positive electrode active material can be adsorbed, and the risks of the precipitation and short circuit on the negative electrode can be reduced. In addition, Ni ions eluted from the positive electrode active material can be adsorbed, and the gelation of the slurry can be easily prevented. Thus, the pore volume of pores having the diameter of less than 2 nm is more preferably 0.53 cm$^3$/g or more, and still more preferably 0.55 cm$^3$/g or more. Meanwhile, if the pore volume of pores having the diameter of less than 2 nm is too large, Li ions are also adsorbed, which may reduce the Li utilization efficiency. Thus, the pore volume of pores having the diameter of less than 2 nm is preferably 1.5 cm$^3$/g or less, more preferably 1.0 cm$^3$/g or less. The pore volume of pores having the diameter of less than 2 nm can be adjusted to the above range by appropriately adjusting, for example, the type of the precursor of the activated carbon, the activation temperature in the method for producing the activated carbon described later, the activation time and the like.

The activated carbon used in the present invention has an ash content of 0.5% by weight or less. The ash content is more preferably 0.48% by weight or less, and still more preferably 0.46% by weight or less. When the ash content is equal to or less than the above upper limit, a short circuit is unlikely to occur, and a reaction with lithium ions which may cause an increase in irreversible capacity is unlikely to occur. The heavy metal compound contained in the ash may diffuse, and may precipitate in the positive electrode during the discharge. Thus, the lower the content, the more preferable. The lower limit of the ash content is not particularly limited and may be 0% or more. The ash content can be determined by measuring the ignition residue, for example, by the method described in Examples described later. The ash content that may be contained in the activated carbon includes nickel, iron, calcium, magnesium aluminum and the like. In particular, nickel is preferably 100 ppm or less, more preferably 80 ppm or less, and iron is preferably 100 ppm or less, more preferably 50 ppm or less. The ash content can also be determined by, for example, IPC emission spectroscopy and the like. The ash content can be adjusted to the above range by appropriately adjusting, for example, the type of the precursor of the activated carbon, the type and concentration of the acid used for the acid washing, the time of the acid washing in the method for producing the activated carbon described later and the like.

The activated carbon used in the present invention preferably has an oxygen content of 1.3% by weight or more and 3% by weight or less. The method for measuring the oxygen content will be described later in Examples. If the oxygen content is too low, the affinity for the electrolytic solution is low, and thereby preventing the penetration of the electrolytic solution into the electrode, which tends to be unfavorable. If the oxygen content is too high, it is not only undesirable since the electrochemical stability may be reduced, but it is also undesirable since the affinity with hydrophobic binders such as PVDF may be reduced, and the electrode strength may be reduced. Thus, the oxygen content is preferably 1.3 to 2.9% by weight, more preferably 1.4 to 2.8% by weight. In addition, a metal eluted from the positive electrode active material, such as nickel, may grow on the negative electrode due to charging and discharging during battery operation, break the separator and cause a short circuit. However, by adjusting the oxygen content within the above range, the eluted nickel can be trapped and such a short circuit can be prevented. Further, when the oxygen content is within the above range, the affinity with a hydrophobic binder such as PVDF is not too high, so that the gelation of the slurry by the hydrophobic interaction is unlikely to occur, and the slurry becomes easy to apply.

The activated carbon used in the present invention preferably has a hydrogen content of 0.33% by weight or more and 0.55% by weight or less. The method for measuring the hydrogen content will be described later in Examples. If the hydrogen content is too low, the affinity for the electrolytic solution is low, and thereby preventing the penetration of the electrolytic solution into the electrode, which tends to be unfavorable. If the hydrogen content is too high, it is not only undesirable since the electrochemical stability may be reduced, but it is also undesirable since the affinity with a hydrophobic binder such as PVDF may be reduced and the electrode strength may be reduced. Thus, the hydrogen content is in the range of 0.33 to 0.53% by weight, more preferably 0.34 to 0.52% by weight. The oxygen content and hydrogen content can be adjusted to the above range by appropriately adjusting, for example, the type of the precursor of the activated carbon, the activation temperature, the activation time, the activation atmosphere in the method for producing the activated carbon described later and the like.

As a particle size of the activated carbon used in the present invention, the average particle size obtained by the laser scattering method is preferably 2 μm to 20 μm. Particles that are too large tend to be unfavorable since they may prevent the conductivity in the positive electrode. Particles that are too small are not only economically unfavorable, but cannot be suppressed by a binder or the like because particles contain fine powder, and is easily released from the inside of the electrode, which may cause deterioration of battery performance such as a short circuit, which is also unfavorable.

(Method for Producing Activated Carbon)

In the present invention, a carbon precursor that is a raw material of the activated carbon is not particularly limited, but is, for example, a plant material such as a coconut shell, coffee bean, tea leaf, sugar cane, fruit (for example, a mandarin orange and banana), straw, rice husk, broadleaf tree, coniferous tree and bamboo, a plant material processed product such as lignin and lignocellulose, a thermosetting resin such as phenolic resin, furan resin and melamine resin, and a fossil fuel such as coal, coal pitch and petroleum pitch. These raw materials may be used alone or in combination of two or more. Among these plant raw materials, a plant-derived raw material is preferable and the coconut shell is preferable since it is easily available and the activated carbon having various characteristics can be produced.

The coconut shell is not particularly limited, but examples thereof include coconut shells of a palm (oil palm), coconut palm, salak and double coconut. These coconut shells may be used alone or in combination of two or more. From the viewpoint of availability, the coconut shells of a coconut palm and a palm, which are biomass wastes generated in large quantities after being used as food, detergent raw materials, biodiesel oil raw materials, or the like are particularly preferable.

The activated carbon used in the present invention is preferably produced by carbonizing a carbon precursor derived from a plant, primary activating, washing and further high-order activating.

The carbonization and activation methods are not particularly limited, but can be produced by publicly-known methods, such as a fixed bed method, moving bed method, fluidized bed method, multi-stage floor method and rotary kiln.

In the method for producing the activated carbon used in the present invention, first, a plant-derived carbon precursor is carbonized. The carbonization method is not particularly limited, but a method of carbonizing at a temperature of about 400 to 800° C. under an atmosphere of an inert gas, such as nitrogen, carbon dioxide, helium, argon, carbon monoxide or fuel exhaust gas, a mixed gas of these inert gases, or a mixed gas with another gas whose main component is these inert gases is mentioned.

After carbonizing the carbon precursor, primary activation is performed. As the activation method, there are a gas activation method and a chemical activation method. In the present invention, the gas activation method is preferable from the viewpoint of the low residual amount of impurities. The gas activation method can be carried out by reacting a carbonized carbon precursor with an activation gas (for example, steam, carbon dioxide gas and the like).

In the primary activation, from the viewpoint of efficiently advancing the activation, a mixture of an inert gas which is similar to that used for carbonization and water vapor is preferable, and a partial pressure of the water vapor at that time is preferably in the range of 10 to 60%. When the partial pressure of water vapor is 10% or more, the activation is likely to proceed sufficiently. When the partial pressure of water vapor is 60% or less, the rapid activation reaction is suppressed and the reaction is easy to control.

The total amount of the activated gas supplied in the primary activation is preferably 50 to 10000 parts by weight, more preferably 100 to 5000 parts by weight, and still more preferably 200 to 3000 parts by weight with respect to 100 parts by weight of the carbon precursor. When the total amount of the activated gas to be supplied is within the above range, the activation reaction can proceed more efficiently.

The activation temperature in the primary activation is usually 700 to 1100° C., preferably 800 to 1000° C. It goes without saying that the activation time and the rate of temperature rise are not particularly limited and vary depending on the type, shape, size, desired pore size distribution and the like of the plant-derived carbon precursor selected. When the activation temperature is risen or the activation time is lengthened in the primary activation, the BET specific surface area of the obtained activated carbon tends to increase. Thus, it is necessary to adjust the activation temperature or activation time in order to obtain the activated carbon having a desired range of the BET specific surface area.

The activation time of the primary activation is not particularly limited, but is usually in the range of 0.5 to 24 hours, preferably in the range of 1 to 20 hours, and more preferably in the range of 1.5 to 18 hours.

Next, it is preferable to wash the activated carbon obtained after the primary activation to reduce the ash content. The washing can be performed by immersing the activated carbon obtained after the primary activation in a washing solution containing an acid. Examples of the washing solution include a mineral acid or organic acid. Examples of the mineral acid include hydrochloric acid, sulfuric acid and the like. Examples of the organic acid include saturated carboxylic acid such as formic acid, acetic acid, propionic acid, oxalic acid and tartrate acid, citric acid, aromatic carboxylic acids such as benzoic acid and terephthalic acid and the like. The acid used for the washing solution is preferably a mineral acid, more preferably hydrochloric acid from the viewpoint of washability. After washing with the acid, it is preferable to remove excess acid by washing with water and the like. This operation can reduce the load on the activation facilities on and after the secondary activation.

The washing solution can usually be prepared by mixing an acid and an aqueous solution. The aqueous solution includes water, a mixture of water and a water-soluble organic solvent and the like. The water-soluble organic solvent includes alcohols such as methanol, ethanol, propylene glycol, ethylene glycol and the like.

The acid concentration in the washing solution is not particularly limited, and may be appropriately adjusted according to the type of acid used. The acid concentration of the washing solution is preferably 0.01 to 3.5% by weight, more preferably 0.02 to 2.2% by weight, and still more preferably 0.03 to 1.6% by weight based on the total amount of the washing solution. When the acid concentration in the washing solution is within the above range, impurities contained in the activated carbon can be efficiently removed, which is preferable.

The temperature of the washing solution on immersing the activated carbon is not particularly limited, and is preferably 0 to 98° C., more preferably 10 to 95° C., and still more preferably 15 to 90° C. When the temperature of the washing solution on immersing the activated carbon is within the above range, the washing can be performed in a practical time and with the load on the apparatus suppressed, which is desirable.

The method for washing the activated carbon is not particularly limited as long as the activated carbon can be immersed in the washing solution, and may be a method in which the activated carbon is immersed in the washing solution with the washing solution being continuously added, retained for a predetermined time, and then withdrawn, or may be a method in which the activated carbon is immersed in the washing solution, retained for a predetermined time, and then immersed in the fresh washing solution after deliquering, thus repeating such immersing and deliquering. In addition, it may be a method of updating the entire washing solution or a method of updating a part of the washing solution. The time for immersing the activated carbon in the washing solution can be appropriately adjusted according to the acid used, the concentration of the acid, the treatment temperature and the like.

The washing time is not particularly limited, but is preferably 0.05 to 4 hours, more preferably 0.1 to 3 hours, from the viewpoint of economic efficiency of the reaction facilities and structural retention of the activated carbon.

The weight ratio between the washing solution and the activated carbon when the activated carbon is immersed in the washing solution may be appropriately adjusted according to the type, concentration, temperature and the like of the washing solution used. The weight of the activated carbon to be immersed is usually 0.1 to 50% by weight, preferably 1 to 20% by weight, and more preferably 1.5 to 10% by weight with respect to the weight of the washing solution. Within the above range, impurities eluted into the washing solution are less likely to precipitate from the washing solution, it is easy to suppress the reattachment to the activated carbon, and volumetric efficiency is appropriate, which is desirable from the viewpoint of economic efficiency.

The atmosphere for the washing is not particularly limited, and may be appropriately selected depending on the method used for the washing. In the present invention, the washing is usually carried out in an air atmosphere.

In the present invention, it is preferable to perform secondary activation of the activated carbon obtained after the washing. The secondary activation can be performed within the same condition range as the primary activation. Similarly, for the secondary activation, the BET specific surface area of the obtained activated carbon tends to increase as the activation temperature is risen or the activation time is lengthened. Thus, the activation temperature and activation time may be adjusted in order to obtain the activated carbon having a desired range of the BET specific surface area.

After the secondary activation, further tertiary activation may be performed, or higher-order activation may be performed. In addition, the washing may be performed between each activation on and after the secondary activation. From the viewpoint of economic efficiency, it is preferable to perform the secondary activation or the secondary and tertiary activation. In the present invention, the tertiary activation and further higher-order activation can be performed within the same condition range as the primary activation.

It is also possible to further wash the activated carbon obtained after the secondary activation or further higher-order activation to remove ash and metal impurities contained in the activated carbon. Further, the activated carbon obtained after the secondary activation or further higher-order activation may be heat-treated at 500° C. or higher and 1500° C. or lower, preferably 800° C. or lower under an inert gas atmosphere or a vacuum atmosphere, and thereby, the residue after the washing may be removed by heat, unnecessary surface functional groups may be removed, and the crystallization of the carbon may be increased to increase the electric conductivity. The heat treatment time is not particularly limited, but is usually in the range of 10 minutes to 3 hours.

It is preferable that the activated carbon thus obtained is then pulverized. The pulverization method is not particularly limited, but a publicly-known pulverization method, such as a ball mill, roll mill or jet mill, or a combination thereof can be employed.

In the present invention, the activated carbon obtained by the pulverization may be classified and used. For example, activated carbon particles having a narrow particle size distribution width can be obtained by excluding particles having a particle size of 1 μm or less. By removing such fine particles, it is possible to reduce the amount of the binder in the electrode configuration. The classification method is not particularly limited, but examples thereof include a classification using a sieve, wet classification and dry classification. The wet classifier includes a classifier using principles such as a gravity classification, inertial classification, hydraulic classification and centrifugal classification. The dry classifier includes a classifier using principles such as a sedimentation classification, mechanical classification and centrifugal classification. From the viewpoint of economic efficiency, it is preferable to use a dry classification device.

The obtained activated carbon may be dried. Drying is an operation for removing the water and the like adsorbed on the activated carbon. For example, by heating the activated carbon, the water and the like adsorbed on the activated carbon can be removed. In addition to or instead of heating, drying can be performed by means such as depressurization, decompression heating and freezing to remove water and the like adsorbed on the activated carbon.

The drying temperature is preferably 100 to 330° C., more preferably 110 to 300° C., and still more preferably 120 to 250° C. from the viewpoint of removing the water adsorbed on the activated carbon.

Although the drying time depends on the drying temperature to be employed, the drying time is preferably 0.1 hours or more, more preferably 0.5 hours or more, and still more preferably 1 hour or more, from the viewpoint of removing the water adsorbed on the activated carbon. Further, from the viewpoint of economic efficiency, the drying time is preferably 24 hours or less, more preferably 12 hours or less, and still more preferably 6 hours or less.

Drying can be performed under normal pressure or reduced pressure atmosphere. When the drying is carried out at normal pressure, it is preferable to carry out the drying under an atmosphere of an inert gas such as nitrogen gas or argon gas or an air atmosphere having a dew point of −20° C. or lower.

The activated carbon obtained as described above can be preferably used as an additive for an electrochemical element positive electrode of the present invention. Further, the additive for an electrochemical element positive electrode of the present invention can also be preferably used as a slurry stabilizer for an electrochemical element positive electrode. Thus, the present invention also encompasses the slurry stabilizer for an electrochemical element positive electrode comprising the additive for an electrochemical element positive electrode.

[Composition for Electrochemical Element Positive Electrode]

The composition for an electrochemical element positive electrode of the present invention comprises the above-mentioned additive for an electrochemical element positive electrode and a positive electrode active material. Further, the composition for an electrochemical element positive electrode of the present invention may optionally comprises other components other than the above.

The content of the additive for an electrochemical element positive electrode is preferably 10% by weight or less, more preferably 8% by weight or less, and still more preferably 6% by weight or less, with respect to the total weight of the positive electrode active material. The lower limit of the content of the additive for an electrochemical element positive electrode is not particularly limited, but is preferably 0.5% by weight or more, and more preferably 1% by weight or more.

Further, the mixing ratio of the additive for an electrochemical element positive electrode and the positive electrode active material described later may be 1:99 to 10:90 in terms of weight ratio. When the mixing ratio of the additive for an electrochemical element positive electrode and the positive electrode active material is included in this range, the output characteristics and the capacity characteristics tend to be good.

[Slurry for Electrochemical Element Positive Electrode]

A slurry for an electrochemical element positive electrode comprises the above-mentioned slurry stabilizer for an electrochemical element positive electrode of the present invention, a positive electrode active material, and a solvent. Since the slurry for an electrochemical element positive electrode is difficult to gelate and the slurry is stable, the slurry has good coatability and an electrochemical element positive electrode can be easily formed on the current collector. Further, the slurry for an electrochemical element positive electrode may optionally comprise other components other than the above.

In the slurry for an electrochemical element positive electrode, the content of the slurry stabilizer for an electrochemical element positive electrode is preferably 10% by weight or less, more preferably 8% by weight or less, and still more preferably 6% by weight or less, with respect to the total weight of the positive electrode active material. When the content of the slurry stabilizer for an electrochemical element positive electrode is in the above range, the amount of the solvent upon preparing the slurry can be reduced, that is, the solid content concentration in the slurry can be increased, and thereby, it is possible to shorten the time required to remove the solvent and to downsize the facilities, and to stabilize the coating characteristics. The lower limit of the content of the slurry stabilizer for an electrochemical element positive electrode is not particularly limited, but is preferably 0.5% by weight or more, and more preferably 1% by weight or more.

The mixing ratio of the slurry stabilizer for an electrochemical element positive electrode and the positive electrode active material described later may be 1:99 to 10:90 by weight ratio. When the mixing ratio of the slurry stabilizer for an electrochemical element positive electrode and the positive electrode active material is included in this range, the output characteristics and the capacity characteristics tend to be good.

(Positive Electrode Active Material)

A positive electrode active material to be blended in the composition for an electrochemical element positive electrode or the slurry for an electrochemical element positive electrode is not particularly limited, and a known positive electrode active material can be used. For example, lithium-containing cobalt oxide ($LiCoO_2$), lithium manganate ($LiMn_2O_4$), lithium-containing nickel oxide ($LiNiO_2$), lithium-containing composite oxide of Co—Ni—Mn, lithium-containing composite oxide of Ni—Mn—Al, lithium-containing composite oxide of Ni—Co—Al, olivine-type lithium iron phosphate ($LiFePO_4$), olivine-type lithium manganese phosphate ($LiMnPO_4$), lithium excess spinel compound represented by $Li_{1+x}Mn_{2-x}O_4$ (0<X<2), metal oxide such as $Li[Ni_{0.17}Li_{0.2}Co_{0.07}Mn_{0.56}]O_2$, $LiNi_{0.5}Mn_{1.5}O_4$ and the like, sulfur, an organic radical such as a compound and polymer having a nitroxyl radical, compound and polymer having an oxyradical, compound and polymer having a nitrogen radical, compound and polymer having a fluvalene skeleton and the like.

These can be used alone or in combination of two or more. Among the above, from the viewpoint of improving the battery capacity of the secondary battery, it is preferable to use lithium-containing cobalt oxide ($LiCoO_2$); lithium-containing nickel oxide ($LiNiO_2$); lithium-containing composite oxide of Co—Ni—Mn, such as $LiNi_{1/3}Co_{1/3}Mn_{1/3}O_2$, $LiNi_{0.5}Co_{0.2}Mn_{0.3}O_2$, $LiNi_{0.8}Co_{0.1}Mn_{0.1}O_2$, and the like; lithium-containing composite oxides of Ni—Co—Al, such as $LiNi_{0.8}Co_{0.1}Al_{0.1}O_2$, $LiNi_{0.8}Co_{0.15}O_2$, and the like, as the positive electrode active material.

The particle size of the positive electrode active material is not particularly limited, and can be the same as that of the conventionally used positive electrode active material. Generally, the range of 0.1 μm to 40 μm, more preferably 0.5 μm to 20 μm is employed.

In the composition for an electrochemical element positive electrode of the present invention, the content of the positive electrode active material may be 40 to 90% by weight with respect to the total solid content weight of the composition.
(Solvent)

The composition for an electrochemical element positive electrode of the present invention may comprise a solvent. As the solvent used in the composition for an electrochemical element positive electrode or the slurry for an electrochemical element positive electrode, for example, an organic solvent can be used, and among them, a polar organic solvent capable of dissolving a binder described later is preferable.

Specifically, as the organic solvent, acetonitrile, N-methylpyrrolidone, acetylpyridine, cyclopentanone, N, N-dimethylacetamide, dimethylformamide, dimethylsulfoxide, methylformamide, methylethylketone, furfural, ethylenediamine and the like can be used. Among them, N-methylpyrrolidone (NMP) is the most preferable from the viewpoint of the ease of handling, safety and ease of synthesis.

These organic solvents may be used alone or in combination of two or more.

The amount of the solvent used is such that the solid content concentration in the composition for an electrochemical element positive electrode or the slurry for an electrochemical element positive electrode is in the range of preferably 1 to 80% by weight, more preferably 5 to 70% by weight, and still more preferably 10 to 60% by weight. By setting the solid content concentration in the above range, the positive electrode active material, the additive for an electrochemical element positive electrode or the slurry stabilizer for an electrochemical element positive electrode, and other components comprised therein can be uniformly dispersed, which is preferable.
(Binder)

It is preferable that the composition for an electrochemical element positive electrode or the slurry for an electrochemical element positive electrode comprises a binder for satisfactorily adhering the positive electrode active material particles to each other and satisfactorily adhering the positive electrode active material to the current collector. As the examples of the binder, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon and the like may be used, but not limited thereto. These may be used alone or in combination.

In the composition for an electrochemical element positive electrode or the slurry for an electrochemical element positive electrode, the content of the binder may be 0.5 to 10% by weight or may be 1 to 7% by weight with respect to the total weight of the solid content in the composition or the slurry.
(Conductive Material)

The composition for an electrochemical element positive electrode or the slurry for an electrochemical element positive electrode may further comprise a conductive material in order to further enhance the conductivity of the positive electrode formed on the current collector. As the conductive material, any electronically conductive material that does not cause a chemical change in the constructed electrochemical element can be used. As specific examples of the conductive material, a carbon-based material such as natural graphite, artificial graphite, carbon black, acetylene black, Ketjen black, carbon fiber and the like, metal powder or a metal fiber such as copper, nickel, aluminum, silver and the like can be used. Alternatively, one kind or a mixture of two or more kinds of the conductive material such as polyphenylene derivatives may be used.

In the composition for an electrochemical element positive electrode or the slurry for an electrochemical element positive electrode, the content of the conductive material may be 1 to 10% by weight or may be 1 to 7% by weight, with respect to the total weight of the solid content in the composition.
(Method for Producing Composition for Electrochemical Element Positive Electrode)

As a method for producing the composition for an electrochemical element positive electrode, the composition can be produced by the method of mixing the above-mentioned additive for an electrochemical element positive electrode, a positive electrode active material, and if necessary, a solvent and other components. The mixing method is not particularly limited, and for example, a general mixing device such as a disper, mill, kneader and the like can be used. For example, it is preferable to stir for 20 minutes or more and 120 minutes or less.

The mixing temperature is not particularly limited, but the mixing is carried out, for example, in the range of 0° C. to 160° C., more preferably in the range of 20° C. to 80° C. If the temperature is too low, the viscosity is high and coating cannot be performed, which is not preferable. If the temperature is too high, from the viewpoint of the safety such as volatilization of the organic solvent and the accompanying viscosity changes, and of the equipment operability, it is not preferable.
(Method for Producing Slurry for Electrochemical Element Positive Electrode)

As a method for producing a slurry for an electrochemical element positive electrode, as same as the above-mentioned composition for an electrochemical element positive electrode, the slurry can be produced by the method of mixing the slurry stabilizer for an electrochemical element positive electrode, a positive electrode active material, and if necessary, other components in a solvent. The mixing method is not particularly limited, and for example, a general mixing device such as a disper, mill, or kneader can be used. For example, it is preferable to stir for 20 minutes or more and 120 minutes or less.

The mixing temperature is not particularly limited, and the mixing is carried out, for example, in the range of 0° C. to 160° C., more preferably in the range of 20° C. to 80° C. If the temperature is too low, the viscosity is high and coating cannot be performed, which is not preferable. If the temperature is too high, from the viewpoint of the safety such as volatilization of the organic solvent and the accompanying viscosity changes, and the equipment operability, it is not preferable.
[Electrochemical Element]

The composition for an electrochemical element positive electrode or the slurry for an electrochemical element positive electrode according to such one embodiment of the present invention may be usefully used for an electrochemical element. The present invention also encompasses an electrochemical element having a positive electrode prepared by using the above-mentioned composition for an electrochemical element positive electrode or slurry for an electrochemical element positive electrode. In the electrochemical element of the present invention, the conductivity of the positive electrode is improved and the electrode resistance can be reduced by containing the above-mentioned additive for an electrochemical element positive electrode. In addition, the lithium utilization efficiency can be improved and the irreversible capacity can be reduced. It is preferable that the electrochemical element of the present invention operates at 2V to 5V, and examples thereof include a lithium ion secondary battery, capacitor and the like.

For example, when the electrochemical element of the present invention is a lithium ion secondary battery, the lithium ion secondary battery comprises a positive electrode, a negative electrode and an electrolyte.

(Positive Electrode)

The positive electrode is produced by using the composition for an electrochemical element positive electrode or the slurry for an electrochemical element positive electrode of the present invention, and comprises a current collector and positive electrode active material layer. The positive electrode active material layer is formed by applying the composition for an electrochemical element positive electrode or the slurry for an electrochemical element positive electrode of the present invention to the current collector.

The method for applying the composition for an electrochemical element positive electrode or slurry for an electrochemical element positive electrode on the current collector is not particularly limited, and a publicly-known method can be used. Specifically, as a coating method, a doctor blade method, dip method, reverse roll method, direct roll method, gravure method, extrusion method, brush coating method and the like can be used. At this time, the composition for an electrochemical element positive electrode or slurry for an electrochemical element positive electrode may be applied to only one side of the current collector, or may be applied to both sides. The thickness of a composition film on the current collector after application and before drying can be appropriately set according to the thickness of the positive electrode active material layer obtained by drying. The positive electrode active material layer may be formed on the current collector only with the solid content of the composition for an electrochemical element positive electrode, not as a composition or slurry comprising a solvent. The forming method is not particularly limited, and the electrode can be made by dry mixing while applying mechanical crushing energy by a ball mill, bead mill, jet mill and the like followed by forming a film on a current collector as powder by such as an aerosol deposition method or the cold spray method, or the electrode can be made on the current collector by kneading a polymer binder followed by pressurized extension to form a film.

As a current collector to which the composition for an electrochemical element positive electrode or the slurry for an electrochemical element positive electrode is applied, a material having electrical conductivity and electrochemical durability is used. Specifically, as the current collector, a current collector comprising aluminum or an aluminum alloy may be used. At this time, aluminum and an aluminum alloy may be used in combination, or different types of aluminum alloys may be used in combination. Aluminum and an aluminum alloy are excellent collector materials since they have heat resistance and are electrochemically stable.

The method for drying the composition for an electrochemical element positive electrode or the slurry for an electrochemical element positive electrode on the current collector is not particularly limited, and a publicly-known method can be used. Examples include drying by warm air, hot air or low-humidity air, vacuum drying and drying methods by irradiation with infrared rays or electron beams. By drying the composition for an electrochemical element positive electrode or slurry for an electrochemical element positive electrode on the current collector in this way, a positive electrode active material layer is formed on the current collector, and a positive electrode comprising the current collector and the positive electrode active material layer can be obtained.

In particular, in order to maintain the metal trapping force of the added activated carbon, it is preferable to sufficiently perform the drying step at the time of producing the positive electrode, and it is preferable to perform the drying to the extent that the current collector (for example, aluminum foil) is not affected and the water adsorbed on the surface of the positive electrode active material and the activated carbon can be volatilized. Preferably, the drying step is carried out at a drying temperature of 100° C. or higher and 160° C. or lower under atmospheric pressure or reduced pressure in the range of 1 hour to 12 hours.

After the drying step, the positive electrode active material layer may be subjected to a pressurizing treatment by using a metallic mold press, roll press and the like. The pressurizing treatment can improve the adhesion between the positive electrode active material layer and the current collector.

(Negative Electrode)

The negative electrode comprises a current collector and a negative electrode active material layer formed on the current collector, and the negative electrode active material layer comprises a negative electrode active material. The process for producing a negative electrode is a process widely known in the art.

The negative electrode active material comprises a substance capable of reversibly intercalating/deintercalating the lithium ions, lithium metal, lithium metal alloy, substance capable of doping and de-doping to lithium or transition metal oxide.

As the substance capable of reversibly intercalating/deintercalating the lithium ions, a crystalline carbon, amorphous carbon, or both of them may be used. Examples of the crystalline carbon include graphite such as amorphous, plate-like, scaly, spherical or fibrous natural graphite or artificial graphite, and examples of the amorphous carbon include soft carbon or hard carbon, mesophase-pitch carbide and calcined coke.

As the lithium metal alloy, an alloy of lithium and a metal selected from the group consisting of Na, K, Mg, Ca, Sr, Si, Sb, In, Zn, Ge, Al and Sn may be used.

The substance capable of doping and de-doping to lithium includes alloys such as Si and SiMg, $SiO_x$ (0<x<2), Sn, $SnO_2$ and the like.

The content of the negative electrode active material in the negative electrode active material layer may be 70% by weight to 100% by weight with respect to the total weight of the negative electrode active material layer. The negative electrode active material layer may be consisting of the negative electrode active material.

The negative electrode active material layer may also comprise a binder, and may optionally further comprise a conductive material. The content of the binder in the negative electrode active material layer may be 1% by weight to 5% by weight with respect to the total weight of the negative electrode active material layer. When the conductive material is further comprised, 80% by weight to 98% by weight of the negative electrode active material, 1% by weight to 10% by weight of the binder and 1% by weight to 10% by weight of the conductive material may be used.

The binder plays a role of satisfactorily adhering the negative electrode active material particles to each other and satisfactorily adhering the negative electrode active material to the current collector. As the binder, a water-insoluble binder, water-soluble binder or combination thereof may be used.

The water-insoluble binder includes polyvinyl chloride, carboxylated polyvinyl chloride, polyvinyl fluoride, polymers comprising ethylene oxide, polyvinylpyrrolidone, polyurethane, polytetrafluoroethylene, polyvinylidene fluoride, polyethylene, polypropylene, polyamideimide, polyimide or a combination thereof.

The water-soluble binder includes styrene-butadiene rubber, acrylated styrene-butadiene rubber, polyvinyl alcohol, sodium polyacrylate, copolymers of propylene and an olefin having 2 to 8 carbon atoms, copolymers of (meth) acrylic acid and (meth) acrylic acid alkyl esters or combinations thereof.

When a water-soluble binder is used as a negative electrode binder, a cellulose-based compound capable of imparting viscosity may be further used as a thickener. The cellulose-based compound includes carboxymethyl cellulose, hydroxypropyl methyl cellulose, methyl cellulose and alkali metal salts thereof, and the content of such thickener used may be 0.1 part by weight to 100 parts by weight with respect to 100 parts by weight of the binder.

The conductive material is used to impart the conductivity to an electrode, and any electronic conductive material that does not cause a chemical change in a constituted battery can be used, and as an example thereof, carbon-based materials such as natural graphite, artificial graphite, carbon black, acetylene black, Ketjen black and carbon fiber; metal-based materials such as metal powder such as copper, nickel, aluminum, silver or metal fiber; conductive polymers such as polyphenylene derivatives; or conductive materials comprising mixtures thereof may be used.

As the current collector, the substance selected from the group consisting of copper foil, nickel foil, stainless steel foil, titanium foil, nickel foam, copper foam, a polymer substrate coated with a conductive metal, and a combination thereof may be used.

(Electrolyte)

The electrolyte preferably comprises at least a non-aqueous organic solvent and a lithium salt.

The non-aqueous organic solvent acts as a medium through which ions involved in the electrochemical reaction of the battery can move.

As the non-aqueous organic solvent, a carbonate-based, ester-based, ether-based, ketone-based, alcohol-based, or non-protonic solvent may be used. As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethylcarbonate (EMC), ethylene carbonate (EC), propylene carbonate (PC), butylene carbonate (BC) and the like may be used, and as the ester-based solvent, n-methyl acetate, n-ethyl acetate, n-propyl acetate, dimethylacetate, methylpropionate, ethylpropionate, γ-butyrolactone, decanolide, valerolactone, mevalonolactone, caprolactone and the like may be used. As the ether-based solvent, dibutyl ether, tetraglyme, diglyme, dimethoxyethane, 2-methyltetrahydrofuran, tetrahydrofuran and the like may be used, and as the ketone-based solvent, cyclohexanone and the like may be used. Further, as the alcohol-based solvent, ethyl alcohol, isopropyl alcohol and the like may be used, and as the non-protonic solvent, nitriles such as R-CN (wherein, R is a linear, branched or ring-structured hydrocarbon groups having 2 to 20 carbon atoms, which may comprise a double bond, aromatic ring or ether bond), amides such as dimethylformamide, dioxolanes such as 1,3-dioxolane, sulfolans and the like may be used.

The non-aqueous organic solvent may be used alone or in combination of two or more. When two or more of non-aqueous organic solvents are mixed, the mixing ratio may be appropriately adjusted according to the target battery performance.

Further, in the case of the carbonate-based solvent, it is preferable to use a mixture of cyclic carbonate and chain carbonate. In this case, when the cyclic carbonate and chain carbonate are mixed and used in a volume ratio of 1:1 to 1:9, the performance of the electrolytic solution may become more superior.

The lithium salt is dissolved in an organic solvent and acts as a source of lithium ions in the battery to enable the basic operation of a lithium ion secondary battery, and is a substance that plays a role to promote the movement of lithium ions between a positive electrode and negative electrode. Typical examples of such lithium salts include, for example, $LiPF_6$, $LiBF_4$, $LiSbF_6$, $LiAsF_6$, $LiCF_3SO_3$, $LiN(SO_2C_2F_5)_2$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein, x and y are natural numbers), LiCl, LiI and $LiB(C_2O_4)_2$ (lithium bisoxalatoborate(LiBOB)). These may be used alone or by mixing of two or more. It is preferred that the concentration of the lithium salt used is in the range of 0.1 to 2.0M. If the concentration of the lithium salt is less than 0.1M, the conductivity of the electrolyte tends to be low and the electrolyte performance tends to deteriorate, and if the concentration of the lithium salt exceeds 2.0M, the viscosity of the electrolyte increases and the mobility of lithium ions tends to decrease.

The electrolyte may further comprise a vinylene carbonate-based or ethylene carbonate-based compound as a life improving agent to improve the battery life.

Representative examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate and the like. When such life improving agent is further used, the used amount may be appropriately adjusted.

In the lithium ion secondary battery of the present invention, a separator may be present between a positive electrode and negative electrode. As such separator, polyethylene, polypropylene, polyvinylidene fluoride, or a multilayer film having two or more layers thereof may be used, and a mixed multilayer film, such as a polyethylene/polypropylene double-layered separator, polyethylene/polypropylene/polyethylene three-layer separator, or polypropylene/polyethylene/polypropylene three-layered separator may be used.

A lithium ion secondary battery is generally formed by facing the positive electrode and negative electrode described above (via a separator if necessary) and immersing them into the electrolytic solution.

EXAMPLES

Hereinafter, examples and comparative examples will be described. However, the following examples are merely one example, and the concepts of the present invention are not limited to the following examples.

(Specific Surface Area by Nitrogen Adsorption BET Method)

An approximate equation derived from a BET equation is described below.

$$p/[v(p_0-p)]=(1/v_mc)+[(c-1)/v_mc](p/p_0) \qquad \text{[Math. 1]}$$

By using the approximate equation, $v_m$ is obtained by substituting an actually measured adsorption amount(v) at a predetermined relative pressure($p/p_0$) by a multi-point method according to nitrogen adsorption at the liquid nitrogen temperature, and the specific surface area (SSA: in m$^2$/g) of the sample was calculated by the following equation.

$$\text{Specific surface area} = \left(\frac{v_m Na}{22400}\right) \times 10^{-18} \quad \text{[Math. 2]}$$

In the equation, $v_m$ is the adsorption amount (cm$^3$/g) required for forming a monomolecular layer on a sample surface, v is the actually measured adsorption amount (cm$^3$/g), $p_0$ is the saturated vapor pressure, p is the absolute pressure, c is the constant (reflecting the adsorption heat), N is the Avogadro's number 6.022×10$^{23}$, and a (nm$^2$) is the area occupied by adsorbate molecules on the sample surface (molecular occupied cross-sectional area).

Specifically, the amount of nitrogen adsorption to the activated carbon at the liquid nitrogen temperature was measured by using "Autosorb-iQ-MP" manufactured by Quantachrome as follows. After the activated carbon used as a measurement sample was filled in a sample tube and the sample tube was cooled to −196° C., the pressure was once reduced, and nitrogen (purity: 99.999%) was then adsorbed to the measurement sample at a desired relative pressure. An adsorbed gas amount v was defined as an amount of nitrogen adsorbed to the sample when the equilibrium pressure was reached at each desired relative pressure.

(Pore Volume)

The adsorption isotherm obtained from the measurement of the nitrogen adsorption amount was analyzed by the NL-DFT method, and a volume of pores having a pore size (pore diameter) less than 2 nm and volume of pores having a pore size (pore diameter) of 2 nm or more and 50 nm or less are calculated as the micropore volume and the mesopore volume, respectively.

(Elemental Analysis)

Elemental analysis was performed by using the oxygen/nitrogen/hydrogen analyzer EMGA-930 manufactured by HORIBA, Ltd.

The detection methods of the analyzer are oxygen: inert gas fusion-non-dispersive infrared absorption method (NDIR), nitrogen: inert gas fusion-thermal conductivity method (TCD), and hydrogen: inert gas fusion-non-dispersive infrared absorption method (NDIR) calibrated with an (oxygen/nitrogen) Ni capsule, TiH$_2$ (H standard sample), and SS-3 (N, O standard sample), and 20 mg of a sample having moisture content measured at 250° C. for about 10 minutes for a pretreatment was put into an Ni capsule and measured after 30 seconds of degasification in the elemental analyzer. The test was performed by analyzing three specimens, and an average value was used as an analysis value.

(Average Particle Diameter by Laser Scattering Method)

The average particle diameter (particle size distribution) of plant-derived char and the activated carbon was measured by the following method. The sample was put into an aqueous solution containing 5 weight % surfactant ("Toriton X100" manufactured by Wako Pure Chemical Industries), treated by an ultrasonic cleaner for 10 minutes or more, and dispersed in the aqueous solution.

The particle size distribution was measured by using this dispersion. Particle size distribution measurement was performed by using a particle diameter/particle size distribution measuring device ("Microtrac MT3000 EXII" manufactured by MicrotracBEL). D50 is the particle diameter at which the cumulative volume is 50%, and this value was used as the average particle diameter.

(Ash Content Measurement Method)

The weight of an alumina crucible that was dummy heated at 900° C. and allowed to cool in a desiccator containing silica gel is measured. After vacuum drying for 8 to 10 hours in a constant temperature dryer adjusted to 120° C., 20 g of an activated carbon that was allowed to cool in a desiccator containing silica gel as a desiccant was placed in an alumina crucible with a volume of 50 ml, and the crucible+activated carbon weight was accurately measured to 0.1 mg. The alumina crucible containing the sample was placed in an electric furnace with dry air introduced into the electric furnace at 20 L/min and the temperature was raised to 200° C. in 1 hour. Then the temperature was raised to 700° C. over 2 hours and kept at 700° C. for 14 hours and the sample was incinerated. After the incineration was completed, the crucible was allowed to cool in a desiccator containing silica gel, the crucible+ash weight was accurately measured to 0.1 mg, and the ash content was calculated from the following formula.

Ash content (weight %)={(crucible+ash weight)−(crucible weight)/(crucible+activated carbon weight)−(crucible weight)}×100 [Math.3]

(Composition for Lithium Ion Secondary Battery Positive Electrode or Slurry for Lithium Ion Secondary Battery Positive Electrode)

30 parts by weight of N-methylpyrrolidone solution in which 3 parts by weight of polyvinylidene fluoride (KF Polymer 7200 manufactured by Kureha Corporation) is dissolved, 93 parts by weight of LiNi$_{1/3}$Co$_{1/3}$Mn$_{1/3}$O$_2$ ("cellSeed C-5H" manufactured by Nippon Chemical Industrial Co., Ltd) as a positive electrode active material, 2 parts by weight of acetylene black ("Denka Black" manufactured by Denki Kagaku Kogyo Co., Ltd) as a conductive material, and 2 parts by weight of an activated carbon prepared in Examples and Comparative Examples described later was added and mixed, the composition was stirred and dispersed with a homomixer (4500 rpm) manufactured by Primix Co., Ltd, while N-methylpyrrolidone is appropriately added so that the solid content concentration of the composition becomes 50% by weight, then a composition for a lithium ion secondary battery positive electrode or slurry for a lithium ion secondary battery positive electrode was obtained.

(Lithium Ion Secondary Battery Positive Electrode)

The above composition for a lithium ion secondary battery positive electrode or slurry for a lithium ion secondary battery positive electrode was applied onto an aluminum foil ("1N30-H", manufactured by Fuji Kako Co., Ltd.) as a current collector by using a bar coater ("T101", manufactured by Matsuo Sangyo Co., Ltd) and dried by a hot air drier (manufactured by Yamato Scientific co., Ltd) at 80° C. for 30 minutes. After primary drying, rolling treatment was performed by using a roll press (manufactured by Hosen Corp.). Then, after punching as a lithium ion secondary battery positive electrode (∅14 mm), a lithium ion secondary battery positive electrode was produced by secondary drying under a reduced pressure condition at 120° C. for 3 hours. The water content at this time were measured by taking the prepared and dried electrode (φ14 mm), heating to 250° C. by a Karl Fischer (manufactured by Mitsubishi Chemical Analytech Co., Ltd.) and measuring the water content under a nitrogen stream. The water content was controlled to be 20 ppm or less so that the added activated carbon was able to exert the action other than water absorption.

(Production of Lithium Ion Secondary Battery)

The above lithium ion secondary battery positive electrode was transferred to a glove box (manufactured by Miwa Manufacturing Co., Ltd.) in an argon gas atmosphere. For a negative electrode, a laminate consisting of a metal lithium foil (thickness 0.2 mm, φ16 mm) as a positive electrode active material layer and a stainless steel foil (thickness 0.2 mm, φ17 mm) as a current collector was used. In addition, a polypropylene-based (cell Guard #2400, manufactured by Polypore) separator is used, and as an electrolyte, a mixed solvent system in which ethylene carbonate (EC) of lithium hexafluorophosphate ($LiPF_6$) and ethylmethyl carbonate (EMC) are added with vinylene carbonate (VC) (1M-$LiPF_6$, EC/EMC=3/7 volume %, VC 2 weight %) was used to inject and a coin-type lithium ion secondary battery (2032 type) was produced.

1. Additive for Lithium Ion Secondary Battery Positive Electrode

Example 1

A char (specific surface area: 370 m²/g) produced from a coconut shell from Philippines was subjected to primary activation at 850° C. for 2 hours using propane combustion gas+water vapor (partial pressure of water vapor: 25%). Then, it was acid-washed with hydrochloric acid (concentration: 0.5 N, diluent: ion-exchanged water) at a temperature of 85° C. for 30 minutes, and then sufficiently washed with ion-exchanged water to remove the residual acid, and dried to obtain a primary activated granular activated carbon. Further, a heat treatment at 700° C. was carried out for 1 hour in a nitrogen atmosphere. This granular activated carbon was finely pulverized so that the average particle size was 6 μm to obtain an activated carbon.

Example 2

A primary activated granular activated carbon was obtained by washing with acid and water as well as drying in the same manner as in Example 1. This granular activated carbon was further subjected to secondary activation at 970° C. for 2 hours using propane combustion gas (partial pressure of water vapor 15%) to obtain a granular activated carbon. The obtained secondary activated granular activated carbon was further washed with acid and water as well as dried, and then a heat treatment at 700° C. was carried out for 1 hour in a nitrogen atmosphere to obtain a secondary washed granular activated carbon. This granular activated carbon was finely pulverized so that the average particle size was 6 μm to obtain an activated carbon.

Example 3

The activation time of Example 1 was extended to 3 hours to obtain a primary activated granular activated carbon having a specific surface area of 1810 m²/g. This granular activated carbon was further subjected to secondary activation at 970° C. using propane combustion gas (partial pressure of water vapor 15%) to obtain a granular activated carbon. The obtained secondary activated granular activated carbon was further washed with acid and water as well as dried, and then a heat treatment at 700° C. was carried out for 1 hour in a nitrogen atmosphere to obtain a secondary washed granular activated carbon. Except for the above, an activated carbon was obtained in the same manner as in Example 1.

Example 4

Example 4 was prepared in the same manner as in Example 1, except that the activated carbon was discharged into a flow vessel with nitrogen having a purity of 99.99% upon the heat treatment discharge, and allowed to cool to 200° C. or lower in a nitrogen gas atmosphere.

This granular activated carbon was finely pulverized so that the average particle size was 6 μm to obtain an activated carbon.

Example 5

A primary activated granular activated carbon was obtained in the same manner as in Example 1. This granular activated carbon was further subjected to secondary activation using propane combustion gas+water vapor (partial pressure of water vapor 15%) at 970° C. until achieving the following specific surface area to obtain a secondary activated granular activated carbon having a specific surface area of 2252 m²/g. The obtained secondary activated granular activated carbon was further washed with acid and water as well as dried, and then a heat treatment at 700° C. was carried out for 1 hour in a nitrogen atmosphere to obtain a secondary washed granular activated carbon. This granular activated carbon was finely pulverized so that the average particle size was 6 μm to obtain an activated carbon.

Example 6

The same procedure as in Example 1 was carried out, and the activated carbon was obtained in the same manner as in Example 1 except that the granular activated carbon was finely pulverized so that the average particle size was 2.4 μm.

Comparative Example 1

An activated carbon was obtained in the same manner as in Example 1 except that the washing with acid was not performed in Example 1.

Comparative Example 2

An activated carbon was obtained in the same manner as in Example 1 except that the primary activation temperature was set to 920° C. in Example 1.

The physical characteristics of the activated carbons obtained in Examples and Comparative Examples are shown in Table 1.

TABLE 1

|  | Specific surface area (BET) [m²/g] | Mesopore volume [cm³/g] | Micropore volume [cm³/g] | Average particle size [μm] | Elemental analysis [weight %] O | Elemental analysis [weight %] H | Ash content [weight %] |
|---|---|---|---|---|---|---|---|
| Example 1 | 1685 | 0.07 | 0.60 | 5.70 | 2.047 | 0.561 | 0.19 |
| Example 2 | 2184 | 0.17 | 0.86 | 5.59 | 2.422 | 0.508 | 0.32 |
| Example 3 | 1834 | 0.11 | 0.72 | 5.82 | 1.453 | 0.352 | 0.03 |
| Example 4 | 1686 | 0.06 | 0.57 | 5.88 | 1.478 | 0.508 | 0.22 |
| Example 5 | 2259 | 0.16 | 0.83 | 5.55 | 1.447 | 0.496 | 0.17 |
| Example 6 | 1571 | 0.08 | 0.62 | 2.35 | 2.044 | 0.537 | 0.21 |
| Comparative Example 1 | 1605 | 0.06 | 0.57 | 6.05 | 3.122 | 0.555 | 0.67 |
| Comparative Example 2 | 1246 | 0.66 | 0.32 | 7.15 | 3.343 | 0.612 | 0.21 |

Examples 7 to 12 and Comparative Examples 3 to 4

By using the activated carbons obtained in Examples 1 to 6 and Comparative examples 1 to 2, a lithium ion secondary battery was prepared according to the above description. For each lithium ion secondary battery obtained, a charge-discharge test was conducted using a charge-discharge tester ("TOSCAT" manufactured by Toyo System Co., Ltd.) after measuring the DC resistance value before the initial charge. As for the DC resistance, the resistance value when 0.5 mA was passed for 3 seconds was measured. Lithium doping was performed to a level of 1 mV relative to the lithium potential at a rate of 70 mA/g with respect to the weight of the active material. A constant voltage of 1 mV relative to the lithium potential was further applied for 8 hours, and the doping was terminated thereafter. The capacity (mAh/g) at this point was defined as the charge capacity. Subsequently, dedoping was performed to a level of 2.5 V relative to the lithium potential at a rate of 70 mA/g with respect to the weight of the active material, and the capacity discharged at this point was defined as the discharge capacity. The percentage of discharge capacity/charge capacity was defined as the charge-discharge efficacy (initial charge-discharge efficiency) and was used as an index of the utilization efficiency of lithium ions in the battery. In addition, the irreversible capacity was calculated by subtracting the discharge capacity from the charge capacity. The results obtained are shown in Table 2.

Comparative Example 5

A lithium ion secondary battery was prepared and its characteristics were measured in the same manner as in Example 7 except that an activated carbon was not added. The results obtained are shown in Table 2.

TABLE 2

|  | Additive for positive electrode | Charge capacity mAh/g | Discharge capacity mAh/g | Irreversible capacity mAh/g | Initial charge-discharge efficiency % | DC resistance (before charge) (Ω) |
|---|---|---|---|---|---|---|
| Example 7 | Example 1 | 185 | 157 | 28 | 85 | 203 |
| Example 8 | Example 2 | 185 | 158 | 27 | 85 | 188 |
| Example 9 | Example 3 | 185 | 156 | 29 | 84 | 212 |
| Example 10 | Example 4 | 185 | 155 | 30 | 84 | 232 |
| Example 11 | Example 5 | 185 | 157 | 28 | 85 | 167 |
| Example 12 | Example 6 | 186 | 158 | 28 | 85 | 158 |
| Comparative Example 3 | Comparative Example 1 |  |  | could not charge |  |  |
| Comparative Example 4 | Comparative Example 2 | 181 | 147 | 34 | 81 | 689 |
| Comparative Example 5 | None | 185 | 153 | 32 | 83 | 609 |

From the results in Table 2, it was found that when the additive for an electrochemical element positive electrode of the present invention was used, the DC resistance was low and the conductivity of the positive electrode was improved. In addition, it was found that the efficiency of lithium ion utilization in the battery was improved since the initial charge/discharge efficiency was high and the irreversible capacity was low. Meanwhile, when the activated carbon of Comparative Example 1 in which the ash content does not meet the range of the present invention was used, the lithium ion secondary battery was short-circuited and the battery characteristics could not be measured. Further, when the activated carbon of Comparative Example 2 whose specific surface area and pore volume do not meet the range of the present invention was used, the DC resistance was higher than that of Comparative Example 5 in which the activated carbon is not included, and the initial charge/discharge efficiency and other battery characteristics were also inferior.

2. Slurry Stabilizer for Lithium Ion Secondary Battery Positive Electrode

Example 13

A char (specific surface area: 370 m²/g) produced from coconut shell from Philippines was subjected to primary activation at 850° C. for 2 hours using propane combustion gas+water vapor (partial pressure of water vapor: 25%). Then, it was acid-washed with hydrochloric acid (concentration: 0.5 N, diluent: ion-exchanged water) at a temperature of 85° C. for 30 minutes and then sufficiently washed with ion-exchanged water to remove the residual acid and dried. Then, a heat treatment at 700° C. was carried out for 1 hour in a nitrogen atmosphere. This granular activated carbon was finely pulverized so that the average particle size was 6 μm to obtain an activated carbon.

Example 14

A primary activated granular activated carbon was obtained by washing with acid and water as well as drying in the same manner as in Example 13. This granular activated carbon was further subjected to secondary activation at 970° C. using propane, combustion gas (partial pressure of water vapor 15%) to obtain a granular activated carbon. The obtained secondary activated granular activated carbon was further washed with acid and water as well as dried, and then a heat treatment at 700° C. was carried out for 1 hour in a nitrogen atmosphere to obtain a secondary washed granular activated carbon. This granular activated carbon was finely pulverized so that the average particle size was 6 μm to obtain an activated carbon.

Example 15

The activation time of Example 13 was extended to 3 hours to obtain a primary activated granular activated carbon having a specific surface area of 1810 m²/g. This granular activated carbon was further subjected to secondary activation at 970° C. using propane combustion gas (partial pressure of water vapor 15%) to obtain a granular activated carbon. The obtained secondary activated granular activated carbon was further washed with acid and water as well as dried, and then a heat treatment at 700° C. was carried out for 1 hour in a nitrogen atmosphere to obtain a secondary washed granular activated carbon. Except for the above, an activated carbon was obtained in the same manner as in Example 13.

Example 16

Example 16 was prepared in the same manner as in Example 13, except that the activated carbon was discharged into a flow vessel with nitrogen having a purity of 99.99% upon the heat treatment discharge, and allowed to cool to 200° C. or lower in a nitrogen gas atmosphere. This granular activated carbon was finely pulverized so that the average particle size was 6 μm to obtain an activated carbon.

Example 17

A primary activated granular activated carbon was obtained in the same manner as in Example 13. This granular activated carbon was further subjected to secondary activation using propane combustion gas+water vapor (partial pressure of water vapor 15%) at 970° C. until achieving the following specific surface area to obtain a secondary activated granular activated carbon having a specific surface area of 2252 m²/g. The obtained secondary activated granular activated carbon was further washed with acid and water as well as dried, and then a heat treatment at 700° C. was carried out for 1 hour in a nitrogen atmosphere to obtain a secondary washed granular activated carbon. This granular activated carbon was finely pulverized so that the average particle size was 6 μm to obtain an activated carbon.

Example 18

The same procedure as in Example 13 was carried out, and the activated carbon was obtained in the same manner as in Example 13 except that the granular activated carbon was finely pulverized so that the average particle size was 2.4 μm.

Comparative Example 6

An activated carbon was obtained in the same manner as in Example 13 except that the heat treatment temperature was 830° C. in Example 13.

Comparative Example 7

An activated carbon was obtained in the same manner as in Example 13 except that the primary activation temperature of was set to 920° C. in Example 13.

Comparative Example 8

An activated carbon was obtained in the same manner as in Example 14 except that the secondary activation temperature was set to 870° C. in Example 14.

The physical characteristics of the activated carbons obtained in Examples and Comparative examples are shown in Table 3.

TABLE 3

| | Specific surface area (BET) [m²/g] | Mesopore volume [cm³/g] | Micropore volume [cm³/g] | Average particle size [μm] | Elemental analysis [weight %] | | Ash content [weight %] |
|---|---|---|---|---|---|---|---|
| | | | | | O | H | |
| Example 13 | 1685 | 0.07 | 0.60 | 5.70 | 2.047 | 0.561 | 0.19 |
| Example 14 | 2184 | 0.17 | 0.86 | 5.59 | 2.422 | 0.508 | 0.32 |
| Example 15 | 1834 | 0.11 | 0.72 | 5.82 | 1.453 | 0.352 | 0.03 |
| Example 16 | 1686 | 0.06 | 0.57 | 5.88 | 1.478 | 0.508 | 0.22 |
| Example 17 | 2259 | 0.16 | 0.83 | 5.55 | 1.447 | 0.496 | 0.17 |

TABLE 3-continued

| | Specific surface area (BET) [m$^2$/g] | Mesopore volume [cm$^3$/g] | Micropore volume [cm$^3$/g] | Average particle size [μm] | Elemental analysis [weight %] O | Elemental analysis [weight %] H | Ash content [weight %] |
|---|---|---|---|---|---|---|---|
| Example 18 | 1571 | 0.08 | 0.62 | 2.35 | 2.044 | 0.537 | 0.21 |
| Comparative Example 6 | 1220 | 0.05 | 0.52 | 5.74 | 2.025 | 0.572 | 0.2 |
| Comparative Example 7 | 1246 | 0.66 | 0.32 | 7.15 | 3.343 | 0.612 | 0.21 |
| Comparative Example 8 | 1570 | 0.03 | 0.49 | 7.22 | 2.561 | 0.512 | 0.4 |

Examples 19 to 24 and Comparative Examples 9 to 12

By using the activated carbons obtained in Examples 13 to 18 and Comparative Examples 6 to 8, a slurry for a lithium ion secondary battery positive electrode and lithium ion secondary battery were prepared according to the above description. For each lithium secondary battery obtained, a charge-discharge test was conducted using a charge-discharge tester ("TOSCAT" manufactured by Toyo System Co., Ltd.). Lithium doping was performed to a level of 1 mV relative to the lithium potential at a rate of 70 mA/g with respect to the weight of the active material. A constant voltage of 1 mV relative to the lithium potential was further applied for 8 hours, and the doping was terminated thereafter. The capacity (mAh/g) at this point was defined as the charge capacity. Subsequently, dedoping was performed to a level of 2.5 V relative to the lithium potential at a rate of 70 mA/g with respect to the weight of the active material, and the capacity discharged at this point was defined as the discharge capacity. The percentage of discharge capacity/charge capacity was defined as the charge-discharge efficacy (initial charge-discharge efficiency) and was used as an index of the utilization efficiency of lithium ions in the battery. In addition, the irreversible capacity was calculated by subtracting the discharge capacity from the charge capacity. The results obtained are shown in Table 4.

(Coatability Evaluation)

The coatability of the composition for a lithium ion secondary battery positive electrode obtained above was evaluated according to the followings. As described above, after drying the coated electrode with hot air at 80° C. for 30 minutes, the case if there are no traces of bubbles or agglomerates on the coated surface was evaluated as ⊚, the case if there are no agglomerates but are traces of bubbles was evaluated as ○, the case if a small amount of agglomerates was observed was evaluated as Δ, and the case if the agglomerates were observed everywhere was evaluated as x. The results obtained are shown in Table 4.

Comparative Example 12

A lithium ion secondary battery was prepared and its characteristics were measured in the same manner as in Example 19 except that an activated carbon was not added. The results obtained are shown in Table 4.

TABLE 4

| | Slurry stabilizer | Coatability | Charge capacity mAh/g | Discharge capacity mAh/g | Irreversible capacity mAh/g | Initial charge-discharge efficiency % |
|---|---|---|---|---|---|---|
| Example 19 | Example 13 | ⊚ | 185 | 157 | 28 | 84.9 |
| Example 20 | Example 14 | ⊚ | 185 | 158 | 27 | 85.4 |
| Example 21 | Example 15 | ○ | 185 | 156 | 29 | 84.3 |
| Example 22 | Example 16 | ○ | 185 | 155 | 30 | 83.8 |
| Example 23 | Example 17 | ○ | 185 | 157 | 28 | 84.9 |
| Example 24 | Example 18 | ○ | 186 | 158 | 28 | 84.9 |
| Comparative Example 9 | Comparative Example 6 | Δ | 186 | 154 | 32 | 82.8 |
| Comparative Example 10 | Comparative Example 7 | X | 181 | 147 | 34 | 81.2 |
| Comparative Example 11 | Comparative Example 8 | Δ | 182 | 146 | 36 | 80.2 |
| Comparative Example 12 | None | X | 185 | 153 | 32 | 82.9 |

From the results in Table 4, when the slurry stabilizer for an electrochemical element positive electrode of the present invention was used, it was found that the slurry coatability is excellent, and that in the lithium ion secondary battery produced by using the slurry stabilizer thereof, the battery characteristics were excellent. Meanwhile, when an activated carbon that does not meet the scope of the present invention was used or when an activated carbon is not contained as a slurry stabilizer, the slurry coatability was poor and the battery characteristics of the obtained lithium ion secondary battery was also poor.

The invention claimed is:

1. An additive for an electrochemical element positive electrode comprising an activated carbon, wherein the activated carbon has a specific surface area in accordance with BET method of 1300-2500 m$^2$/g, a pore volume of pores having a diameter of 2 nm or more of 0.35 cm$^3$/g or less, a pore volume of pores having a diameter less than 2 nm of 0.5 cm³/g or more, and an ash content of 0.5% by weight or less.

2. The additive for an electrochemical element positive electrode according to claim 1, wherein the activated carbon has an oxygen content of 1.3% by weight or more and 3% by weight or less, and a hydrogen content of 0.33% by weight or more and 0.55% by weight or less.

3. The additive for an electrochemical element positive electrode according to claim 1, wherein the activated carbon has an average particle size of 2 μm to 20 μm.

4. A slurry stabilizer for an electrochemical element positive electrode comprising the additive for an electrochemical element positive electrode according to claim 1.

5. A composition for an electrochemical element positive electrode comprising:
   the additive for an electrochemical element positive electrode according to claim 1; and
   a positive electrode active material,
   wherein a content of the additive for an electrochemical element positive electrode is 10% by weight or less with respect to a total weight of the positive electrode active material.

6. The composition for an electrochemical element positive electrode according to claim 5, further comprising:
   a binder in an amount of 0.5 to 10% by weight with respect to a total solid content of the composition for an electrochemical element positive electrode.

7. The composition for an electrochemical element positive electrode according to claim 5, further comprising:
   a conductive material in an amount of 1 to 10% by weight with respect to a total solid content of the composition for an electrochemical element positive electrode.

8. An electrochemical element, comprising:
   an electrochemical element positive electrode, wherein the positive electrode comprises a layer comprising the composition for an electrochemical element positive electrode according to claim 5.

9. The electrochemical element according to claim 8, wherein the electrochemical element operates from 2V to 5V.

10. The electrochemical element according to claim 8, wherein the electrochemical element is a non-aqueous electrolyte secondary battery.

11. The additive for an electrochemical element positive electrode according to claim 1, wherein the activated carbon has a pore volume of pores having a diameter of 2 nm or more of 0.02 cm³/g-0.35 cm³/g, and a pore volume of pores having a diameter less than 2 nm of 0.5 cm³/g-1.5 cm³/g.

12. The additive for an electrochemical element positive electrode according to claim 11, wherein the activated carbon has an oxygen content of 1.3% by weight or more and 3% by weight or less, and a hydrogen content of 0.33% by weight or more and 0.55% by weight or less.

13. The additive for an electrochemical element positive electrode according to claim 11, wherein the activated carbon has an oxygen content of 1.4% by weight or more and 2.8% by weight or less, and a hydrogen content of 0.34% by weight or more and 0.52% by weight or less.

14. A slurry stabilizer for an electrochemical element positive electrode comprising the additive for an electrochemical element positive electrode according to claim 11.

15. The additive for an electrochemical element positive electrode according to claim 1, wherein the activated carbon has a specific surface area in accordance with BET method of 1500-2200 m²/g, a pore volume of pores having a diameter of 2 nm or more of 0.06 cm³/g-0.25 cm³/g, a pore volume of pores having a diameter less than 2 nm of 0.55 cm³/g-1.0 cm³/g, and an ash content of 0.46% by weight or less.

16. The additive for an electrochemical element positive electrode according to claim 15, wherein the activated carbon has an oxygen content of 1.3% by weight or more and 3% by weight or less, and a hydrogen content of 0.33% by weight or more and 0.55% by weight or less.

17. The additive for an electrochemical element positive electrode according to claim 15, wherein the activated carbon has an oxygen content of 1.4% by weight or more and 2.8% by weight or less, and a hydrogen content of 0.34% by weight or more and 0.52% by weight or less.

18. A slurry stabilizer for an electrochemical element positive electrode comprising the additive for an electrochemical element positive electrode according to claim 15.

19. A composition for an electrochemical element positive electrode comprising:
   the additive for an electrochemical element positive electrode according to claim 15; and
   a positive electrode active material,
   wherein a content of the additive for an electrochemical element positive electrode is 10% by weight or less with respect to a total weight of the positive electrode active material.

20. The additive for an electrochemical element positive electrode according to claim 1, wherein the activated carbon has an oxygen content of 1.4% by weight or more and 2.8% by weight or less, and a hydrogen content of 0.34% by weight or more and 0.52% by weight or less.

* * * * *